United States Patent
Andreoli-Fang et al.

(10) Patent No.: US 10,135,579 B2
(45) Date of Patent: Nov. 20, 2018

(54) PRIORITY BASED SCHEDULING FOR LTE UPLINK TRANSMISSIONS

(71) Applicant: Cable Television Laboratories LLC, Louisville, CO (US)

(72) Inventors: Jennifer Andreoli-Fang, Boulder, CO (US); Alireza Babaei, San Jose, CA (US)

(73) Assignee: Cable Television Laboratories, Inc., Louisville, CO (US)

(*) Notice: Subject to any disclaimer, the term of this patent is extended or adjusted under 35 U.S.C. 154(b) by 194 days.

(21) Appl. No.: 15/154,962

(22) Filed: May 14, 2016

(65) Prior Publication Data

US 2016/0337094 A1 Nov. 17, 2016

Related U.S. Application Data

(60) Provisional application No. 62/161,443, filed on May 14, 2015.

(51) Int. Cl.
*H04L 1/18* (2006.01)
*H04W 72/12* (2009.01)
(Continued)

(52) U.S. Cl.
CPC .......... *H04L 1/1832* (2013.01); *H04L 1/0058* (2013.01); *H04L 1/0061* (2013.01);
(Continued)

(58) Field of Classification Search
CPC ......... H04W 72/1231; H04W 72/1242; H04W 72/1268; H04W 72/1294; H04W 84/12;
(Continued)

(56) References Cited

U.S. PATENT DOCUMENTS 6,977,888 B1 12/2005 Dahlman et al.
2007/0237117 A1 10/2007 Moon et al.
(Continued)

OTHER PUBLICATIONS

Wong, D et al. "Wireless Broadband Networks" [online] Mar. 2009; http://www.wiley.com/WileyCDS/WileyTitle/produceCd-047018177X.html. Chapter 11, pp. 404-408, ISBN: 978-0-470-18177-5.

*Primary Examiner* — Christine Ng
(74) *Attorney, Agent, or Firm* — Duft Bornsen & Fettig, LLP

(57) ABSTRACT

Systems and methods presented herein provide for an eNodeB operating in an RF band comprising a conflicting wireless technology. One exemplary eNodeB assigns an ID to a UE, processes a scheduling request for UL data from the UE, processes another scheduling request for second UL data from the UE, determines priorities of the first and second UL data based on priority indicators in the scheduling requests, and grants time and frequency for the UE to transmit the first and second UL data. The eNodeB also waits until the UE performs an LBT operation. The LBT determines whether the granted time and frequency are occupied by another wireless system comprising a different wireless technology. The eNodeB also determines that the first UL data is stale, and transmits the ID to the UE to reserve the granted time and frequency for the second UL data when unoccupied by the other wireless system.

18 Claims, 14 Drawing Sheets

(51) Int. Cl.
*H04W 72/14* (2009.01)
*H04L 5/00* (2006.01)
*H04L 1/00* (2006.01)
*H04L 1/08* (2006.01)
*H04W 74/00* (2009.01)
*H04W 84/04* (2009.01)
*H04W 88/06* (2009.01)
*H04W 74/08* (2009.01)

(52) U.S. Cl.
CPC ............. *H04L 1/08* (2013.01); *H04L 1/1825* (2013.01); *H04L 1/1893* (2013.01); *H04L 5/0055* (2013.01); *H04W 72/1284* (2013.01); *H04W 72/14* (2013.01); *H04W 74/006* (2013.01); *H04W 74/08* (2013.01); *H04W 84/042* (2013.01); *H04W 88/06* (2013.01)

(58) Field of Classification Search
CPC ............... H04W 74/006; H04W 72/14; H04W 72/1284; H04L 5/0005; H04L 1/1832; H04L 1/08; H04L 1/0061; H04L 1/0058; H04L 1/1893; H04L 5/0055; H04L 1/1825
See application file for complete search history.

(56) References Cited

U.S. PATENT DOCUMENTS

| 2013/0095760 | A1 | 4/2013 | Thota et al. |
| 2014/0086175 | A1 | 3/2014 | Hakola et al. |
| 2015/0163805 | A1* | 6/2015 | Cattoni et al. .... H04W 72/0453 370/329 |
| 2015/0245232 | A1* | 8/2015 | Luo .................. H04W 24/08 370/252 |
| 2015/0289293 | A1* | 10/2015 | Zhang .................. H04W 4/22 455/404.1 |

* cited by examiner

| QCI | Resource Type | Priority | Packet Delay Budget (ms) | Packet Error Loss Rate | Services |
|---|---|---|---|---|---|
| 1 | GBR | 2 | 100 | $10^{-2}$ | Conversational voice |
| 2 | GBR | 4 | 150 | $10^{-3}$ | Conversational voice (live streaming) |
| 3 | GBR | 5 | 300 | $10^{-6}$ | Non-Conversational video (buffered streaming) |
| 4 | GBR | 3 | 50 | $10^{-3}$ | Real-time gaming |
| 5 | Non-GBR | 1 | 100 | $10^{-6}$ | IMS signaling |
| 6 | Non-GBR | 7 | 100 | $10^{-3}$ | Voice, video (live streaming), interactive gaming |
| 7 | Non-GBR | 6 | 300 | $10^{-6}$ | Video (buffered streaming) |
| 8 | Non-GBR | 8 | 300 | $10^{-6}$ | TCP based data (e.g., email, internet), FTP, P2P file sharing, etc. |
| 9 | Non-GBR | 9 | 300 | $10^{-6}$ | |

*FIG. 9*

PRIORITY BASED SCHEDULING FOR LTE UPLINK TRANSMISSIONS

CROSS REFERENCE TO RELATED APPLICATIONS

This patent application claims priority to, and thus the benefit of an earlier filing date from, U.S. Provisional Patent Application No. 62/161,443 (filed May 14, 2015), the entire contents of which are hereby incorporated by reference.

BACKGROUND

Cellular telephony continues to evolve at a rapid pace. Cellular telephone networks currently exist in a variety of forms and operate using a variety of modulations, signaling techniques, and protocols, such as those found in 3G and LTE networks (3rd Generation of mobile telecommunications technology and Long Term Evolution, respectively). As consumers require more capacity, the networks usually evolve. For example, some carriers, or Mobile Network Operators (MNOs), employ a combination of 3G and the faster LTE because MNOs needed faster networks to satiate the increased demand for data and voice.

Moreover, efforts exist to implement these technologies in radio frequency (RF) bands that comprise conflicting communications. For example, there has been accelerated development of LTE in unlicensed bands (a.k.a. LTE-U and Licensed-Assisted-Access, or "LAA-LTE") where WiFi has traditionally been implemented. Unlike LTE, however, WiFi employs a method of Listen Before Talk (LBT) to ensure that WiFi systems do not interfere with one another. If LTE were to also employ LBT, it would decrease the ability of user equipment ("UEs", such as cellphones and other mobile devices) to make uplink (UL) transmissions.

SUMMARY

Systems and methods presented herein provide for channel reservation for a wireless telephony system operating in a radio frequency (RF) band with a wireless system comprising a conflicting wireless technology. In one embodiment, an eNodeB assigns an ID (e.g., a pseudo random sequence, or "PN sequence") to a user equipment (UE), processes a scheduling request for uplink (UL) data from the UE, processes another scheduling request for second UL data from the UE, determines priorities of the first and second UL data based on priority indicators in the scheduling requests, and grants time and frequency for the UE to transmit the first and second UL data. The eNodeB also waits until the UE performs an LBT operation. The LBT determines whether the granted time and frequency are occupied by another wireless system comprising a different wireless technology. The eNodeB also determines that the first UL data is stale, and transmits the ID to the UE to reserve the granted time and frequency for the second UL data when unoccupied by the other wireless system.

In another embodiment, a method is operable with a UE communicating with the eNodeB. The method includes processing an ID of the user equipment (UE) from the eNodeB operating in the RF band, prioritizing first uplink (UL) data and second UL data, wherein the first UL data has a higher priority than the second UL data, and transmitting scheduling requests for the first and second UL data from the UE to the eNodeB indicating priorities of the first and second UL data. The method also includes waiting until the granted time and frequency are clear of another wireless system employing a different wireless technology operating in the RF band, discarding the first UL data, and transmitting the second UL data from the UE to the eNodeB.

The various embodiments disclosed herein may be implemented in a variety of ways as a matter of design choice. For example, some embodiments herein are implemented in hardware whereas other embodiments may include processes that are operable to implement and/or operate the hardware. Other exemplary embodiments, including software and firmware, are described below.

BRIEF DESCRIPTION OF THE FIGURES

Some embodiments of the present invention are now described, by way of example only, and with reference to the accompanying drawings. The same reference number represents the same element or the same type of element on all drawings.

FIG. 9 is an exemplary table of the QoS Class Identifiers.

DETAILED DESCRIPTION OF THE FIGURES

The figures and the following description illustrate specific exemplary embodiments of the invention. It will thus be appreciated that those skilled in the art will be able to devise various arrangements that, although not explicitly described or shown herein, embody the principles of the invention and are included within the scope of the invention. Furthermore, any examples described herein are intended to aid in understanding the principles of the invention and are to be construed as being without limitation to such specifically recited examples and conditions. As a result, the invention is not limited to the specific embodiments or examples described below.

Figure 1:
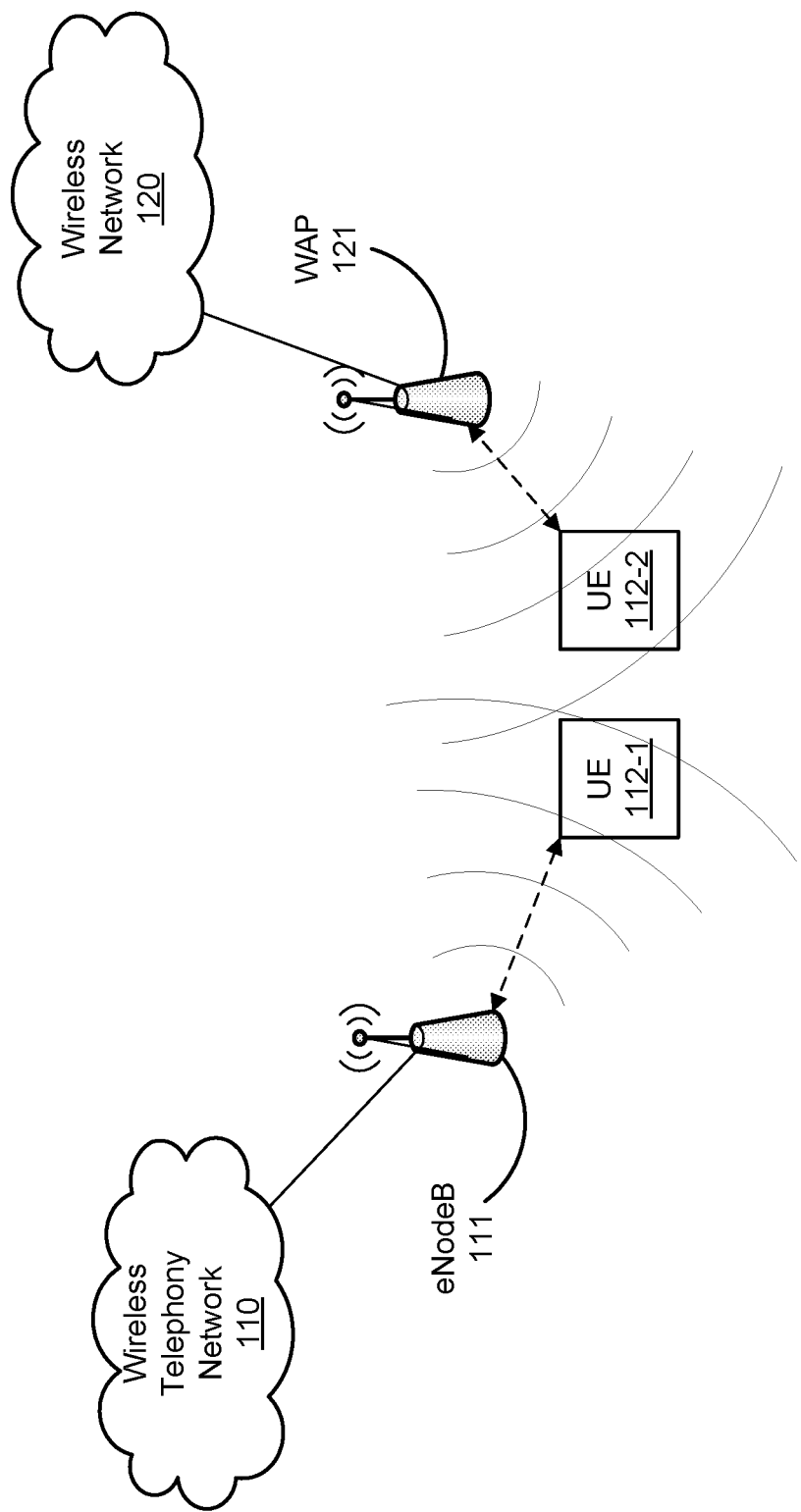
FIG. 1 is a block diagram of an exemplary wireless telecommunications system operating in an RF band with a conflicting wireless system.

FIG. 1 is a block diagram of an exemplary wireless telecommunications system operating in an RF band with a conflicting wireless system. The wireless telecommunications system comprises an eNodeB 111 communicatively coupled to a wireless telephony network 110. Generally, the eNodeB 111 is any system, apparatus, software, or combination thereof operable to maintain or otherwise support wireless communications, including data and voice, with subscribers via their UEs 112 (e.g., mobile handsets and other wireless devices). In this regard, the eNodeB 111 may implement the wireless communications of the wireless telephony network 110 over RF via, for example, 2G, 3G, LTE, 5G, or the like.

The conflicting wireless system comprises wireless access point (WAP) 121 communicatively coupled to the wireless network 120. The wireless system of the WAP 121 conflicts with the wireless telecommunications system of the eNodeB 111 as the wireless system of the WAP 121 uses a form of wireless technology that is incompatible with the communication protocols of the wireless telecommunications system of the eNodeB 111. Thus, communications between the UE 112-2 and the WAP 121 can interfere with the communications between the UE 112-1 and the eNodeB 111.

To illustrate, the eNodeB 111 may be part of an LTE wireless telephony network, whereas the WAP 121 may be part of a WiFi network (e.g., a WiFi hotspot or a personal WiFi router). Generally, this means that the eNodeB 111 is operating in an unlicensed band of RF, such as the industrial, scientific, and medical (ISM) band, where WiFi communications have flourished. Because these bands are so cluttered with WiFi communications, WiFi devices (e.g., the UE 112-2) employ LBT to ensure that they do not interfere with one another when operating via WiFi. LTE communications, however, tend to occupy an entire band of frequencies at any given time to ensure that their communications between their UEs 112 can be sustained. Thus, at the very least, an LTE wireless telephony network will interfere with other communication systems in the band. So, to be more "friendly" with other wireless systems in an unlicensed band, the embodiments herein provide for LBT operations between the UE 112-1 and an eNodeB 111 of a wireless telephony network 110.

The media access control (MAC) of LTE uses a centralized scheduler where the eNodeB 111 schedules UL and downlink (DL) traffic. LBT generally does not present problems on LTE DL transmissions because the eNodeB 112 transmits when it has successfully contended for a channel. UL transmissions, however, are scheduled at precise instances of time and frequency. And, LBT disrupts the timing of the scheduled UL transmissions.

In LTE, the UE 112-1 transmits when the UE 112-1 has been granted a time and frequency by the eNodeB 111. To be granted a time and frequency by the eNodeB 111, the UE 112-1 schedules a request for a UL data transmission, which may be done in various ways. For example, the UE 112-1 may send a one bit indicator in a Scheduling Request (SR) when it needs UL shared channel (SCH) resources. Alternatively or additionally, the UE 112-1 may transmit a Buffer Status Report (BSR) when the UE 112-1 already has a valid scheduling grant so as to indicate its queue depth with the BSR. Generally, the BSR is sent as part of the MAC header in the payload such that the UE 112-1 can "piggyback" on the BSR when using the UL resource.

However, in the unlicensed RF band, the UE 112-1 needs to perform LBT before each UL transmission because the channel may not be clear at the time of its scheduled transmission. LBT increases the uncertainty of when the UE will get to transmit, and therefore increases the delay incurred on the UL data. When the UE 112-1 successfully contends for the channel to transmit its data, the data may have already passed a delay budget based on the LTE protocols and is discarded.

After the eNodeB 111 receives the SR, the eNodeB 111 starts a timer that keeps track of the elapsed time from the channel frequency/time grant resulting from the SR. When the timer elapsed passes a threshold delay, the eNodeB 111 starts monitoring the channel for the UE. When the channel has cleared, the eNodeB 111 reserves the channel on behalf of the UE 112-1 by broadcasting a UE-specific ID to reserve the channel. Upon receiving the ID, the UE 112-1 immediately transmits its data, or with a short delay. In one embodiment, the UE-specific ID is a pseudorandom number (PN) sequence already assigned to each UE used mainly during UE handover. This channel reservation can also be implemented by piggybacking its indication of UL data on the BSR of the LTE protocol.

Figure 2:
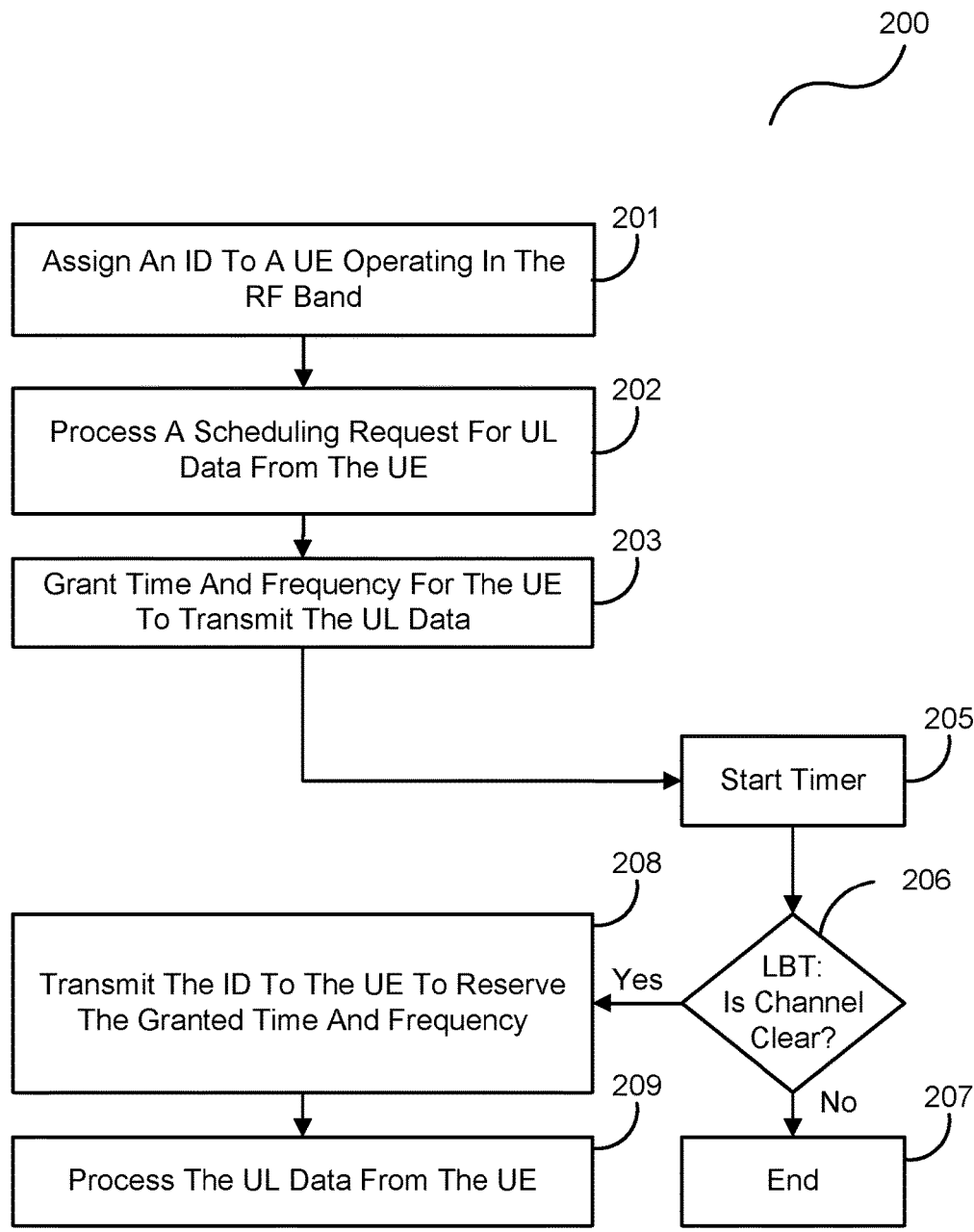
FIG. 2 is a flowchart illustrating an exemplary process operable with the eNodeB in the wireless telecommunications system.

With this in mind, FIG. 2 is a flowchart illustrating an exemplary process 200 operable with the wireless telecommunications system employing the eNodeB 111. In this embodiment, the eNodeB 111 assigns an ID to the UE 112-1 operating in the RF band of the eNodeB 111, in the process element 201. When the UE 112-1 needs to transmit UL data to the eNodeB 111, the UE 112-1 transmits an SR for UL data. In this regard, the eNodeB 111 processes the SR for UL data from the UE 112-1, in the process element 202. Based on a priority of the UL data, the eNodeB 111 grants a time and frequency for the UE 112-1 to transmit its UL data to the eNodeB 111, in the process element 203.

The eNodeB 111 starts a timer, in the process element 205, and then performs an LBT operation, in the process element 206, to determine whether the channel is clear (i.e., at the granted time and frequency). If the channel is clear, the eNodeB 111 transmits the assigned ID to the UE 112-1 to reserve the granted time and frequency for the UE 112-1 to transmit its UL data, in the process element 208. Otherwise, the process 200 ends, in the process element 207. For example, the UL data may include high-priority voice data. However, the packetized UL data may include a relatively small portion of speech in the UL communications to the eNodeB 111. Accordingly, if a channel cannot be reserved before the timer expires, the packetized data containing the speech may be dropped as it is no longer fresh, resulting in a negligible amount of lost speech. And, if the UL 112-1 can transmit its UL data, the eNodeB 111 processes the UL data from the UE 112-1, in the process element 209.

Figure 3:
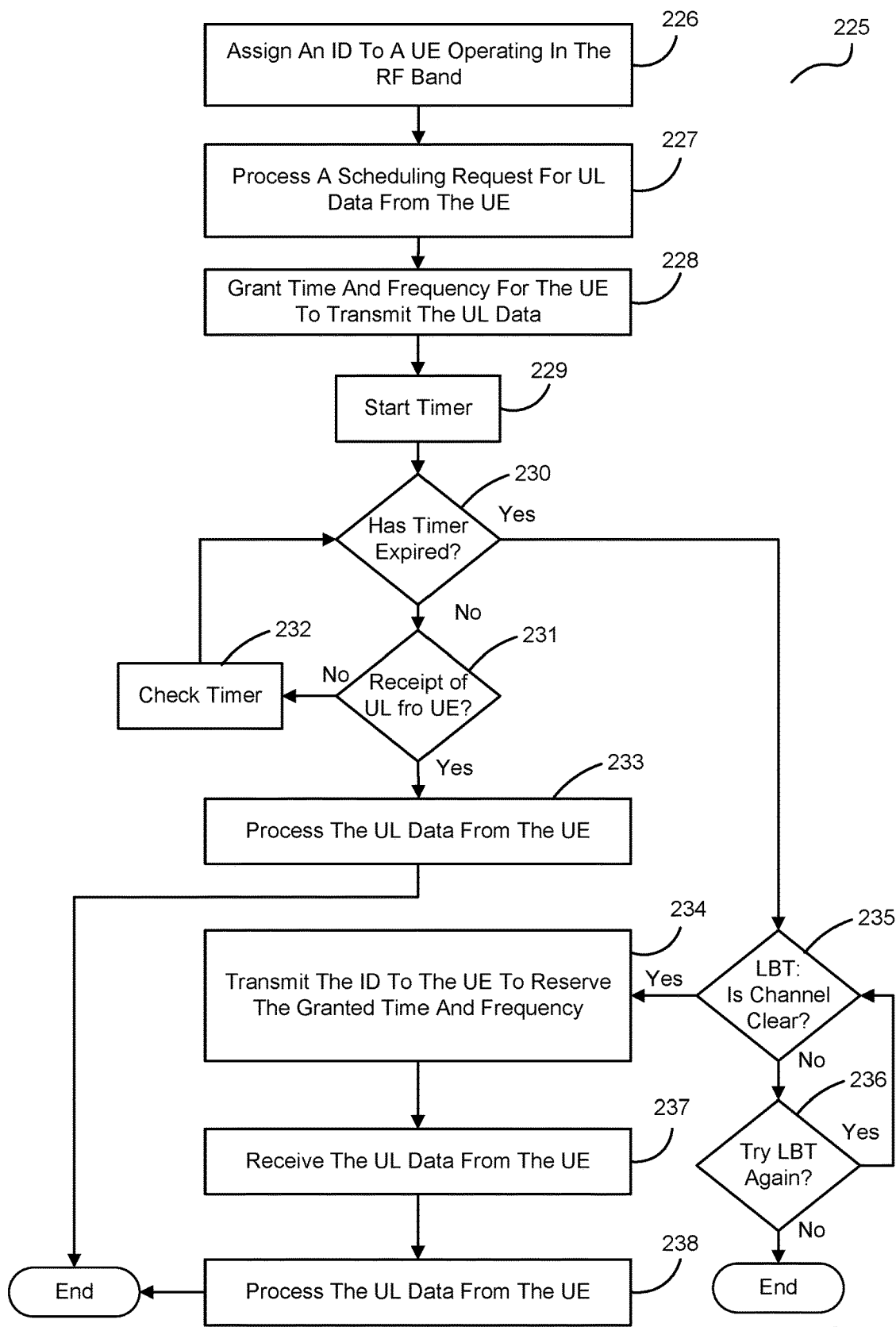
FIG. 3 is a flowchart illustrating another exemplary process operable with the eNodeB in the wireless telecommunications system.

FIG. 3 is a flowchart illustrating another exemplary process 225 operable with the eNodeB 111 in the wireless telecommunications system. The eNodeB 111 assigns an ID to the UE 112-1 operating in the RF band, in the process element 226. This allows the UE 112-1 to communicate with the eNodeB 111. The eNodeB 111 processes a scheduling request for UL data from the UE 112-1, in the process element 227. The eNodeB 111 grants a time and frequency for the UE 112-1 to transmit the UL data, in the process element 228. The eNodeB 111 starts a timer, in the process element 229, to determine whether the UE 112-1 is able to transmit the UL data within the granted time and frequency.

If the timer expires, in the process element 230, then the eNodeB 111 performs an LBT to determine whether the channel is clear, in the process element 235. If the timer has not expired, then the eNodeB 111 determines if it has received the UL data from the UE 112-1, in the process element 231, and continues to check the timer, in the process element 232, until the timer has expired (i.e., the process element 230).

If the channel is clear, in the process element 235, then the eNodeB 111 transmits the ID to the UE 112-1 to reserve the granted time frequency, in the process element 234. From there, the eNodeB 111 receives and processes the UL data from the UE 112-1, in the process elements 237 and 238, and the process ends until the UE 112-1 needs to transmit additional UL data. If the channel is not clear, then the eNodeB 111 may attempt to perform another LBT, in the process element 236, otherwise the process ends.

If the eNodeB 111 receives the UL data from the UE 112-1, in the process element 231, then the eNodeB 111 processes the UL data from the UE 112-1, in the process element 233 and the process ends, that is until the UE 112-1 needs to transmit additional UL data.

Figure 4:
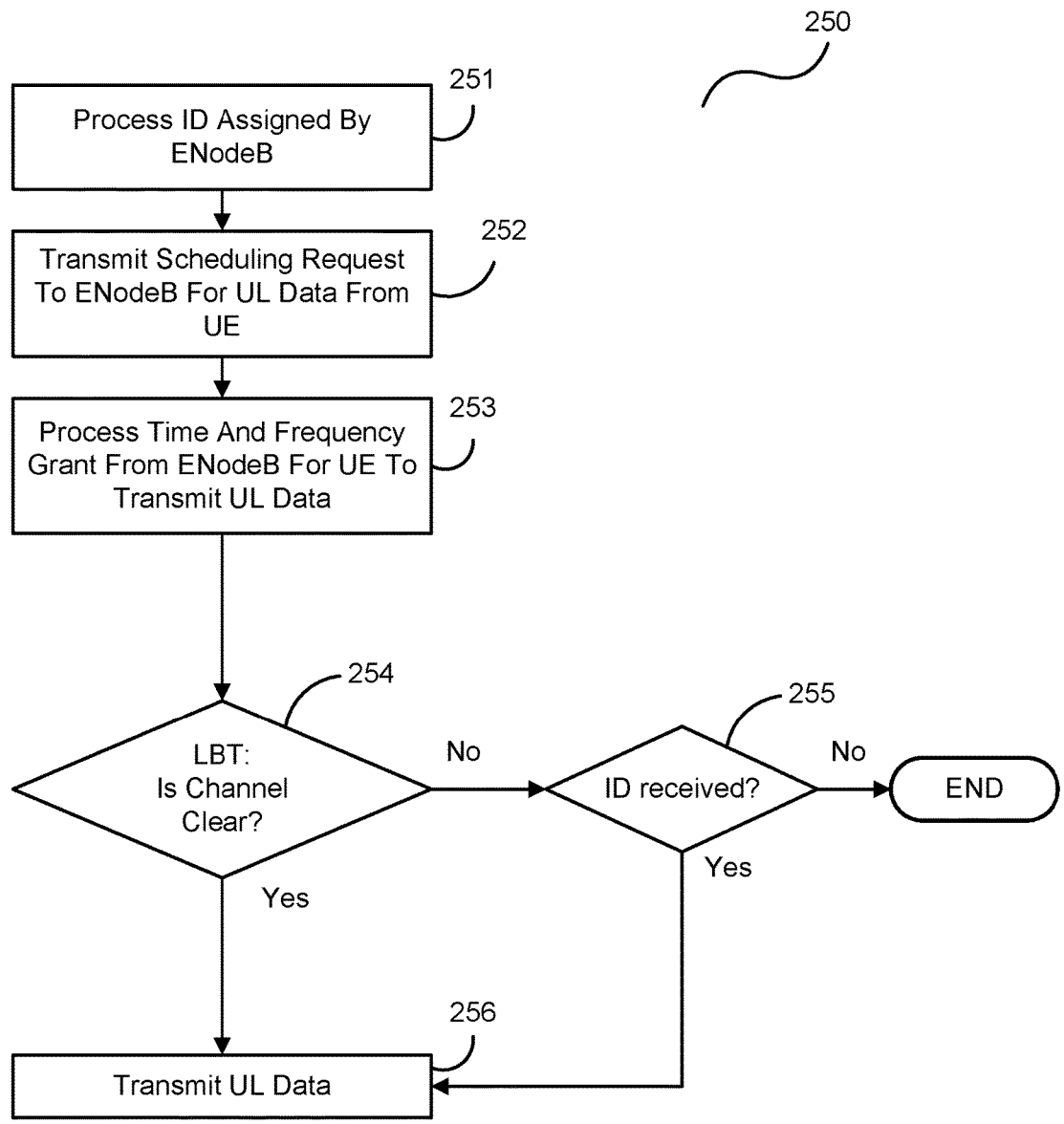
FIG. 4 is a flowchart illustrating an exemplary process operable with the UE in the wireless telecommunications system.

FIG. 4 is a flowchart illustrating another exemplary process 250 operable with the wireless telecommunications system. In this embodiment, the process 250 is illustrated with respect to the UE 112-1. Thus, the process 250 initiates with the UE 112-1 processing the ID assigned by the eNodeB 111, in the process element 251. The UE 112-1 transmits the SR to the eNodeB 111 for scheduling transmission of its UL data, in the process element 252. Once the eNodeB 111 grants a time and frequency for its UL data of the UE 112-1, the UE 112-1 processes the time and frequency grant from the eNodeB 111, in the process element 253. The UE 112-1 then performs an LBT operation to determine whether the channel is clear, in the process element 254.

Once the channel clears, the UE 112-1 determines whether it has received the ID to reserve the channel, in the process element 255. If so, the UE 112-1 processes the ID assigned by the eNodeB 111, in the process element 255, and the UE 112-1 then transmits the UL data to the eNodeB 111, in the process element 256. If the ID is not received, then the process 250 ends until the UE 112-1 needs to transmit another block of UL data. In this regard, the UE 112-1 may discard the UL data.

Figure 5:
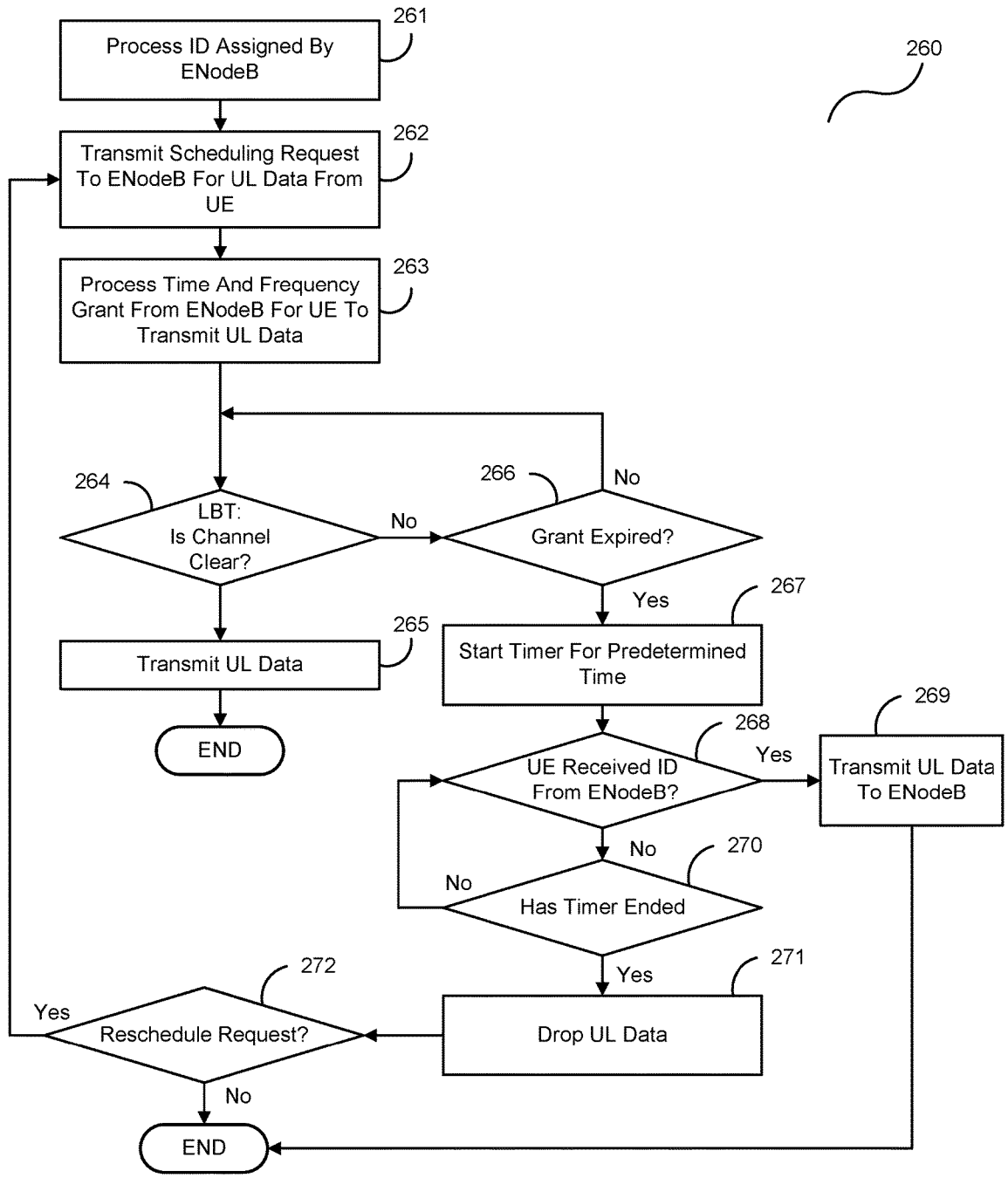
FIG. 5 is a flowchart illustrating another exemplary process operable with the UE in the wireless telecommunications system.

FIG. 5 is a flowchart illustrating another exemplary process 260 operable with the UE 112-1 in the wireless telecommunications system. In this embodiment, the UE 112-1 processes the ID assigned by the eNodeB 111, in the process element 261. The UE 112-1 transmits a schedule request to the eNodeB 111 for UL data from the UE 112-1, in the process element 262. The UE 112-1 processes a time and frequency grant from the eNodeB 111 for the UE 112-1 to transmit UL data, in the process element 263.

The UE 112-1 determines whether the channel is clear by performing an LBT process for a pre-determined time prior to granted time, in the process element 264. For example, the UE 112-1 may implement a timer. However, in processing for a predetermined time (t-n) prior to the grant time (t), a timer may not be necessary as the time window for each process is already known. If the channel is clear, then the UE 112-1 transmits the UL data, in the process element 265 and the process ends (i.e., until the UE 112-1 needs to transmit additional UL data). If the channel is not clear, then the UE 112-1 determines whether the time frequency grant has expired, in the process element 266. If the grant has not expired, then the UE 112-1 continues to determine whether the channel is clear through the LBT process (i.e., process element 264).

If the time and frequency grant has expired, then the UE 112-1 starts a timer for a predetermined period, in the process element 267. From there, the UE 112-1 determines whether it has received the ID from the eNodeB 111, in the process element 268. If the UE 112-1 has received the ID from the eNodeB 111, then the UE 112-1 transmits the UL data to the eNodeB 111, in the process element 269, and the process ends (i.e., until the UE 112-1 needs to transmit additional UL data).

If the UE 112-1 has not received the ID from the eNodeB 111 (i.e., the process element 268), then the UE 112-1 determines whether the timer has expired, in the process element 270, and continues to check whether it has received the ID from the eNodeB 111 until the timer has expired. If the timer has expired, then the UE 112-1 may drop the UL data, in the process element 271, and reschedule a request to transmit UL data, in the process element 272. If the UE 112-1 determines that it needs to reschedule the UL data request, and the process 260 returns to the process element 262. Otherwise, the process 260 ends (i.e., until the UE 112-1 needs to transmit additional UL data).

Figure 6:
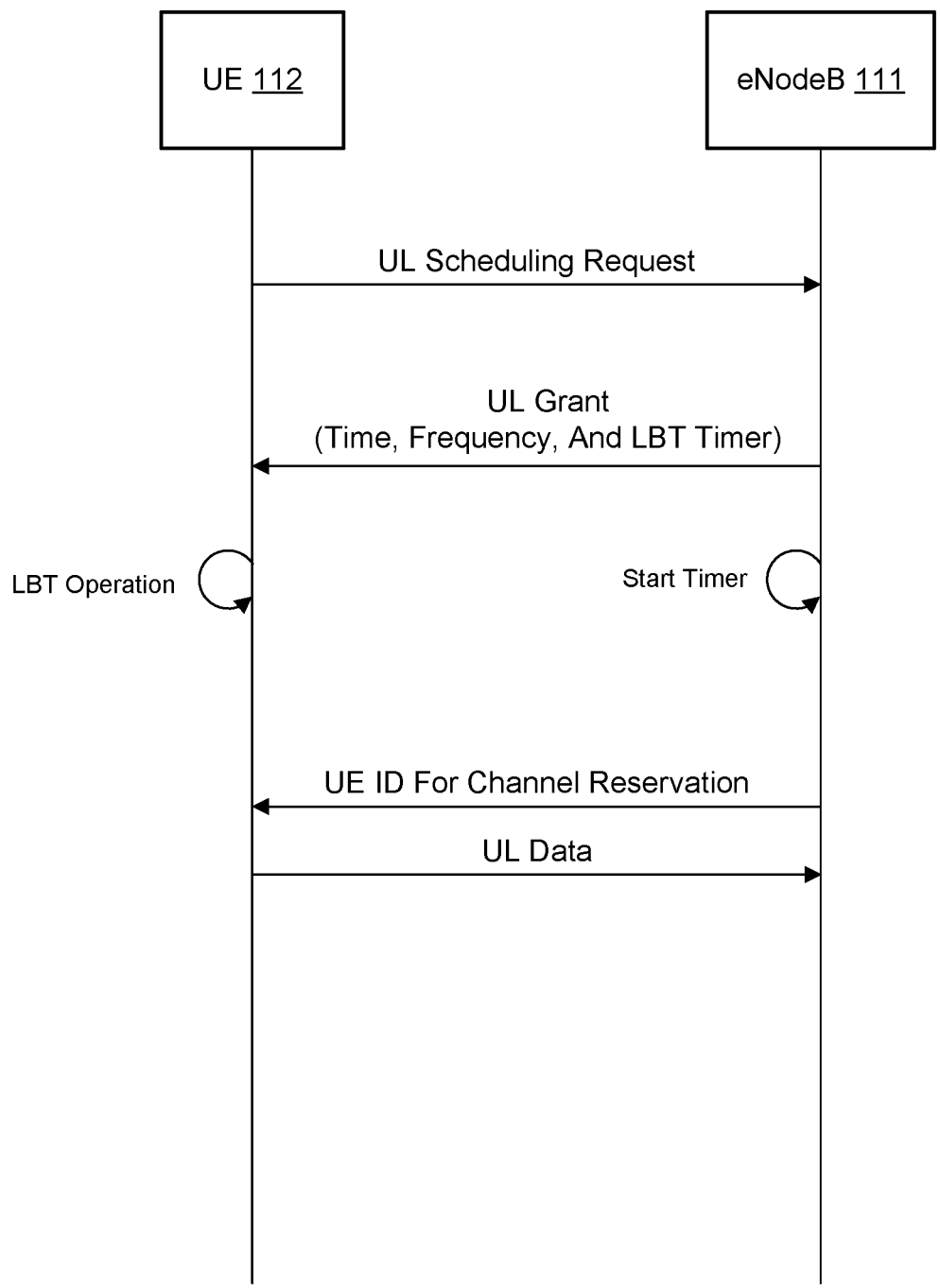
FIG. 6 is an exemplary messaging diagram between a UE and an eNodeB in the wireless telecommunications system.

FIG. 6 is an exemplary messaging diagram between a UE 112 and an eNodeB 111 in the wireless telecommunications system. Again, the UE 112 sends an SR to the eNodeB 111 for scheduling transmission of the UL data. The eNodeB 111, in turn, responds with a UL data transmission grant with a designated time and frequency. The eNodeB 111 then starts a timer and while the UE 112-1 performs the LBT operation. The UL grant may also include the LBT timer which lets the UE 112 know how long it has to determine whether the granted channel is clear of communications from another conflicting wireless system. Once the channel clears and the timer has not expired, the eNodeB 111 transmits the assigned ID for channel reservation such that the UE 112 can transmit its UL data.

Figure 7:
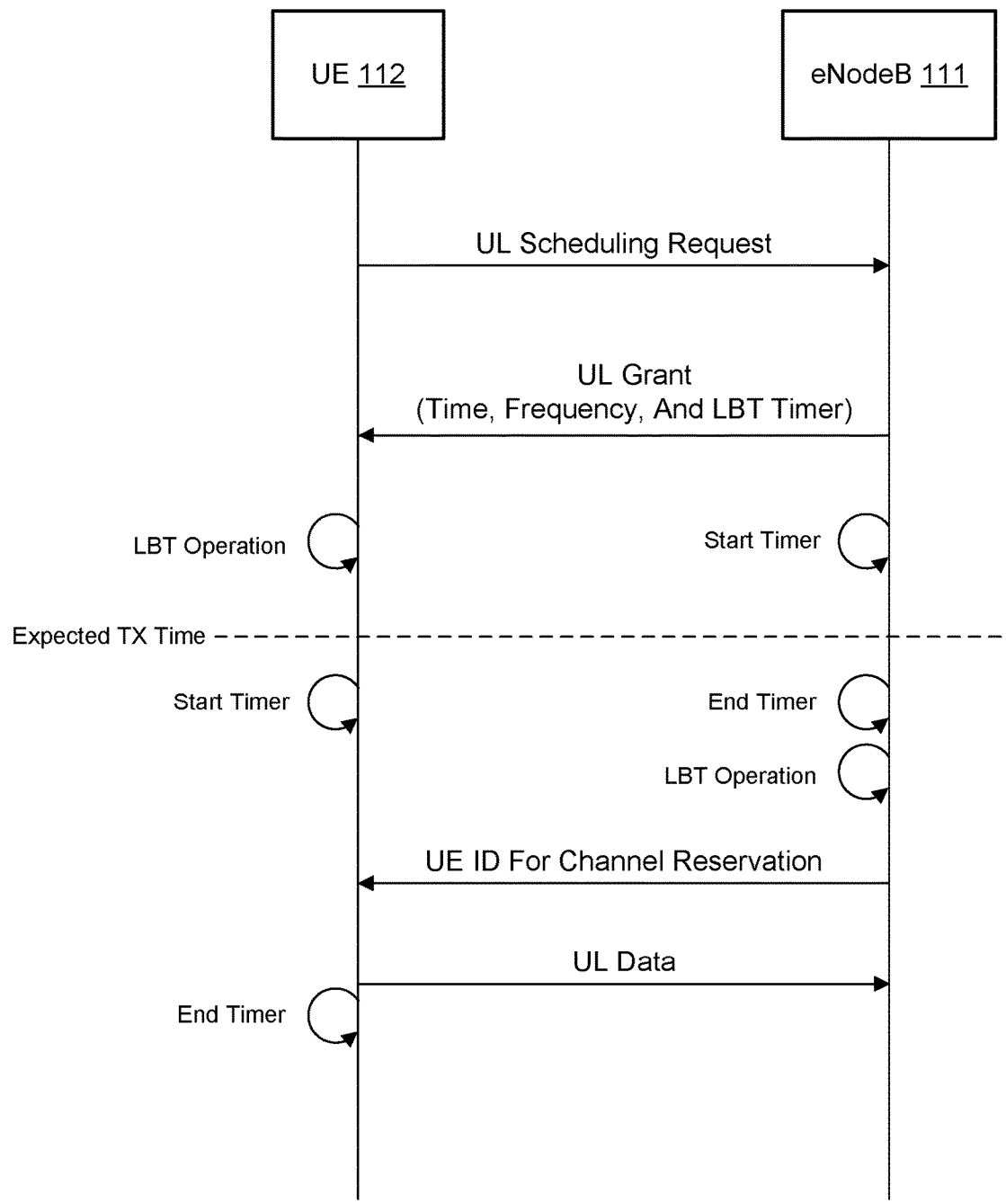
FIG. 7 is another exemplary messaging diagram between a UE and an eNodeB in the wireless telecommunications system.

FIG. 7 is another exemplary messaging diagram between a UE 112 and an eNodeB 111 in the wireless telecommunications system. This embodiment represents a messaging sequence in which the UE 112 fails LBT and the UE 112-1 is unable to transmit UL data in the allocated time indicated by the UL grant even though the eNodeB 111 successfully reserves the channel after allocated time of the UL grant. The sequence begins with the UE 112 transferring a UL data scheduling request. The eNodeB 111 responds with a UL grant including a time, frequency, and an LBT timer. The UE 112 performs an LBT operation and the eNodeB 111 may start its timer, with the end of the timer being set to expire after the expected transmission of UL data from the UE 112-1. However, this may not be necessary, as the eNodeB 111 generally knows when it should receive UL data from the UE 112-1.

After the time expected for the UE 112 to transmit its data has expired, the UE 112 starts a timer, which substantially coincides with end of the eNodeB 111's timer. The eNodeB 111 performs an LBT operation and, if the channel is clear, sends the ID to the UE 112 to reserve the channel. From there, the UE 112 is free to transmit its UL data. Sending the ID to the UE 112 to reserve the channel may be, for example a one-to-one communication, a one-to-many communication, a broadcast communication, a multi-hop relay communication, etc.

Figure 8:
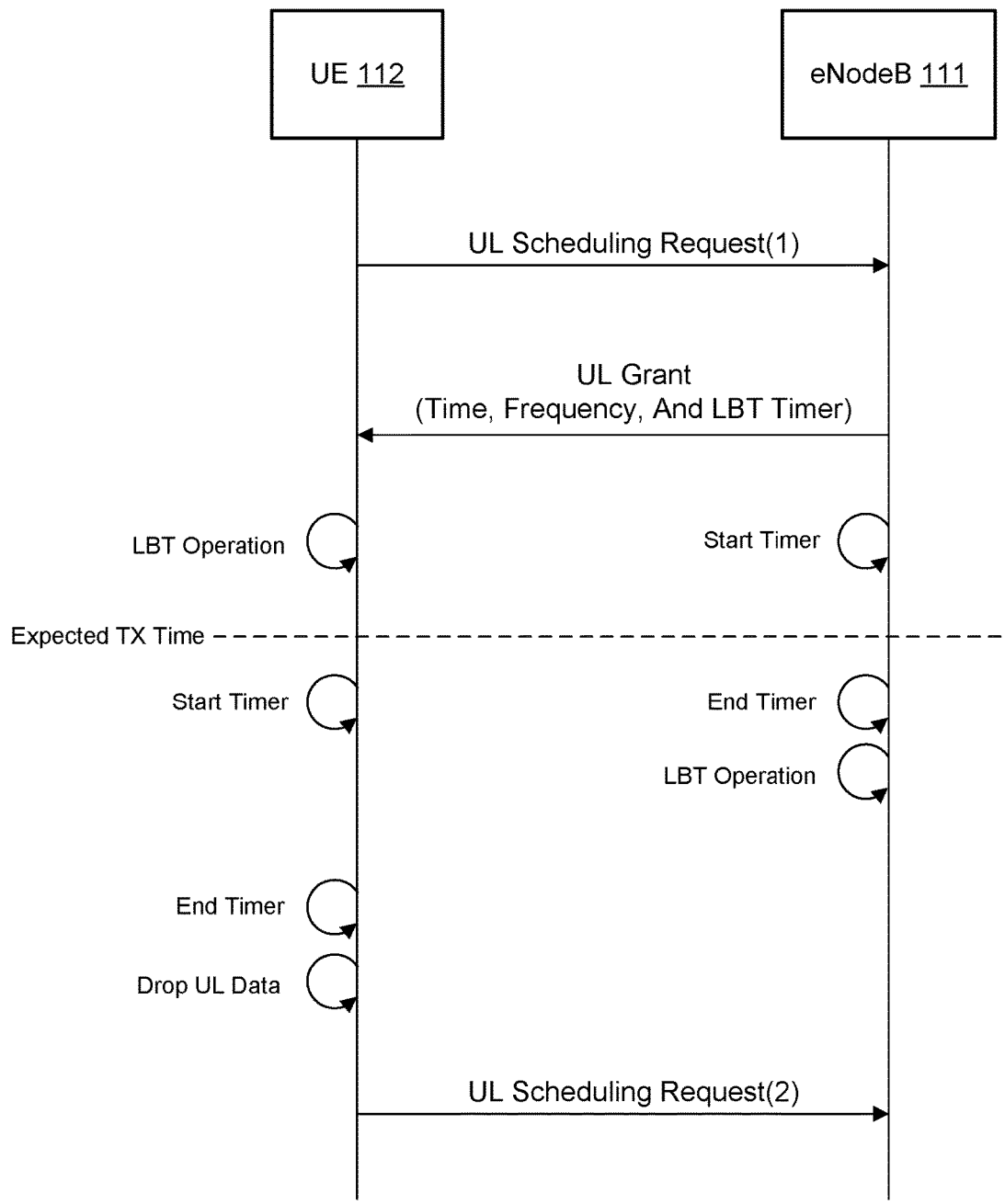
FIG. 8 is another exemplary messaging diagram between a UE and an eNodeB in the wireless telecommunications system.

FIG. 8 is another exemplary messaging diagram between a UE 112 and an eNodeB 111 in the wireless telecommunications system. This embodiment represents where the UE 112 fails LBT and is unable to transmit UL data in the allocated time indicated by the UL grant. The embodiment also illustrates that the eNodeB 111 also fails the LBT and is therefore unable to reserve the channel for the UE 112 after the allocated time of the UL grant. Thus, the sequence begins with the UE 112 transferring a first UL scheduling request and the eNodeB 111 granting the request with a time, frequency, and an LBT timer for the UE 112.

Again, the UE 112 performs an LBT operation and the eNodeB 111 starts its timer. The sequence continues as with FIG. 7 until the eNodeB 111 performs its LBT operation and determines that the channel is not clear. Then, the UE 112's timer expires and it drops the UL data. The UE 112 may then send a second scheduling request to the eNodeB 111 to reattempt transmission of the UL data.

In one embodiment, the timer is a dynamically assigned by the eNodeB 111 based on a QOS for the UE 112-1. For example, a UL scheduler of the eNodeB 111 in LTE communications traditionally schedules UL data transmissions based on current loading of eNodeB 111, capability of the UE 112-1, cell capacity of the eNodeB 111, interference, resource block (RB) utilization at neighboring cells, etc. While those factors are still considered, in this embodiment, the eNodeB 111 establishes and updates the timer for each UE 112 communicating with the eNodeB 111 based on their various traffic flows (a.k.a. bearer traffic). To illustrate, each type of bearer traffic may have an associated QOS Class identifier (QCI) that takes into consideration factors such as delay, jitter, guaranteed bit rate (GBR), non-GBR, etc. And, each UE 112 may have multiple forms of air traffic to transmit to the eNodeB 111. Examples of these QCIs are illustrated in the table 280 of FIG. 9.

Figure 10:
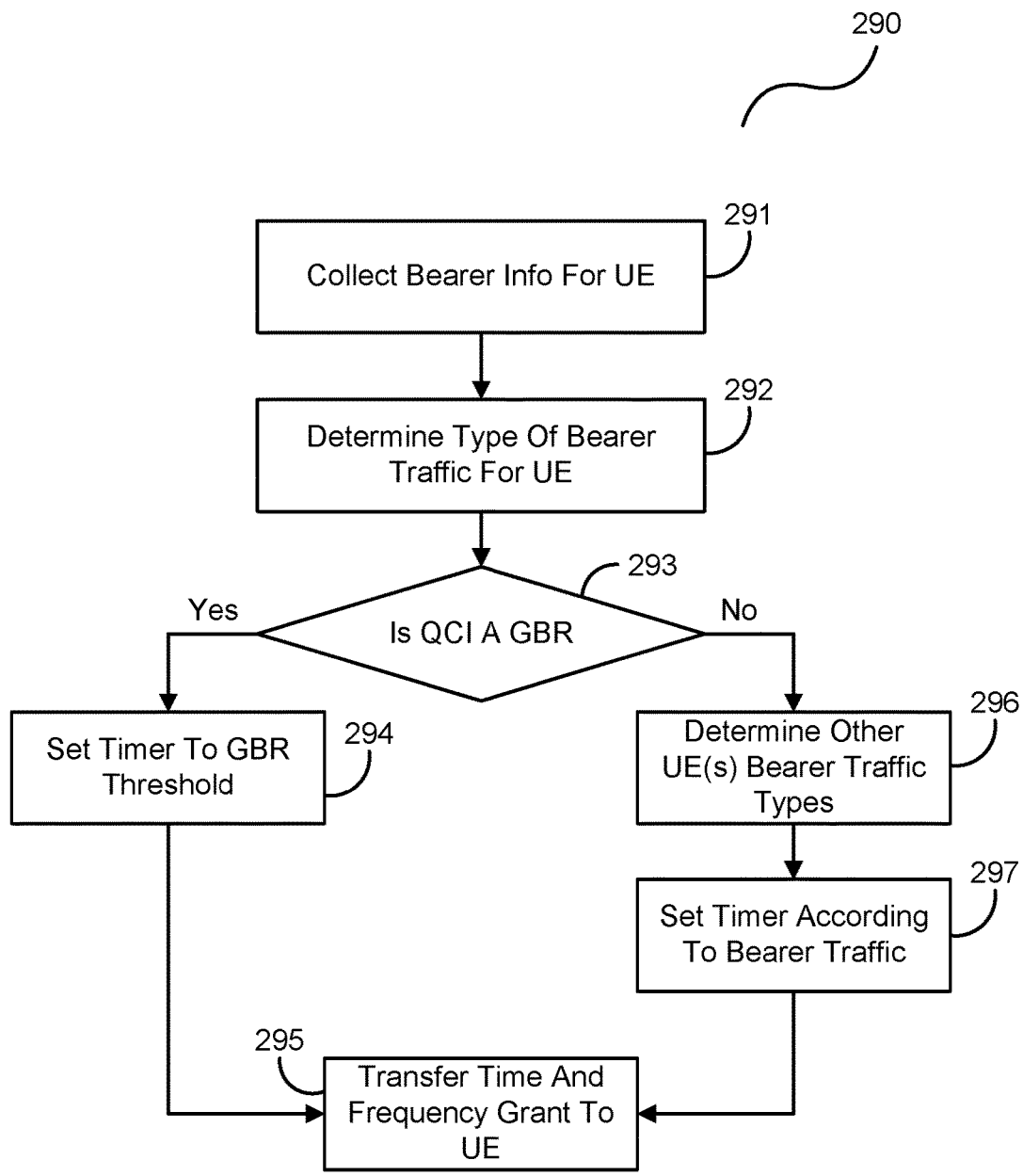
FIG. 10 is a flowchart illustrating another exemplary process operable with the wireless telecommunications system for determining an LBT timer based on Quality of Service (QoS) Class Identifiers.

With this in mind, FIG. 10 illustrates a flowchart of a process 290 of the eNodeB 111. The eNodeB 111 collects the bearer info for a UE 112, in the process element 291, and determines the type of bearer traffic for the UE 112, in the process element 292, as illustrated in FIG. 10. The eNodeB 111 then determines whether the QCI of the bearer traffic being presented to the eNodeB 111 (e.g., through an SR to the eNodeB 111) has a GBR, in the process element 293. If the bearer traffic has a GBR, then the eNodeB 111 sets the timer to a GBR threshold, in the process element 294. Generally, this means that the bearer traffic is high-priority UL data, such as conversational voice. Accordingly, the timer should be set to some minimal amount (e.g., as a matter of design choice) so as to quickly discard the UL data when it becomes stale in the event that the channel is not clear. The eNodeB 111 then transfers the time and frequency grant to the UE 111, in the process element 295, such that the UE 112 can perform the LBT operation to determine whether the channel is clear, as described above.

If the bearer traffic does not have a GBR, then the eNodeB 111 determines other types of bearer traffic presented from other UEs 112 currently assigned to the eNodeB 111, in the process element 296. With this information, the eNodeB 111 establishes a timer according to the bearer traffic of the other UEs 112, in the process element 297. For example, the types of bearer traffic that do not have a GBR may include non-conversational video (e.g., buffered streaming video) where the UL data can be saved/stored and transmitted over time as the delivery of that data is not time sensitive. The eNodeB 111 may collect information from the other UEs 112 having bearer traffic to determine an aggregate QCI and arrive at a timer based on that aggregate QCI. Once the timer has been computed, the eNodeB 111 transfers the time and frequency grant to the UE 111 (and other UEs 112 with bearer traffic assigned to the eNodeB 111), in the process element 295.

Additionally, when a UE 112-1 has multiple bearers (i.e., multiple types of UL traffic), the UE 112-1 makes its own decisions on which bearer traffic to transmit first upon receiving a grant. In this regard, the UE 112-1 prioritizes its traffic to transmit its most delay sensitive traffic first. This is the reason for setting the timer to the delay budget of the QCI with a stringent delay requirement among all of the traffic bearers of the UE 112-1. But, when the UE 112 has only non-GBR bearers (e.g., non-time sensitive traffic), the eNodeB 111 can set the timer to the system load by adjusting it according to, for example, a 95th percentile delay of all the traffic bearers that the eNodeB 111 serves to improve the QOS for the users The MAC layer of the UE 112 is an intelligent entity that controls logical channel multiplexing. Above the MAC layer is the Radio Link Control (RLC) layer, where the traffic from different service bearers are segregated. In many cases, the MAC layer of the UE 112-1 commands the RLC to pull from each logical channel buffer based on various rules, including QOS requirements of the bearer.

For example, during initial deployments of LTE, multiple bearers, particularly those with different QCIs, were not widely used. However, as users of the UEs 112 have more applications and more types of data, multiple bearers need to be provisioned. And, as LTE moves into the unlicensed spectrum with implementations of LBT, the UE 112 can no longer be in complete control of scheduling its own transmissions because if a UE 112 schedules its UL data transmission based on the priority of the bearer, higher priority bearers will always get served first, and lower priority, non-GBR bearers may be "starved" of transmission resources.

In these embodiments, the UE 112 now contends for a channel prior to transmission. Accordingly, in one embodiment, non-GBR traffic is sent first with the possibility of discarding GBR traffic altogether, as some GBR traffic can afford to miss transmissions. For example, a packet of voice conversation data that is dropped will generally only result in a negligible amount of lost speech.

To prioritize the data at the UE 112, the embodiments herein provide for a 2-bit priority indicator field added to the SR that indicates whether the SR has high priority data, low priority data, or a combination thereof. This allows the eNodeB 111 to gain a granular control of the UE 112$s$ scheduling mechanism. When the UE 112 has indicated both high and low priority traffic in the SR, but the eNodeB 111 has only indicated low priority traffic in the grant, this is an indication that the high priority traffic has passed (e.g., the timer has expired) such that the UL data can be discarded by the UE 112.

Figure 11A:
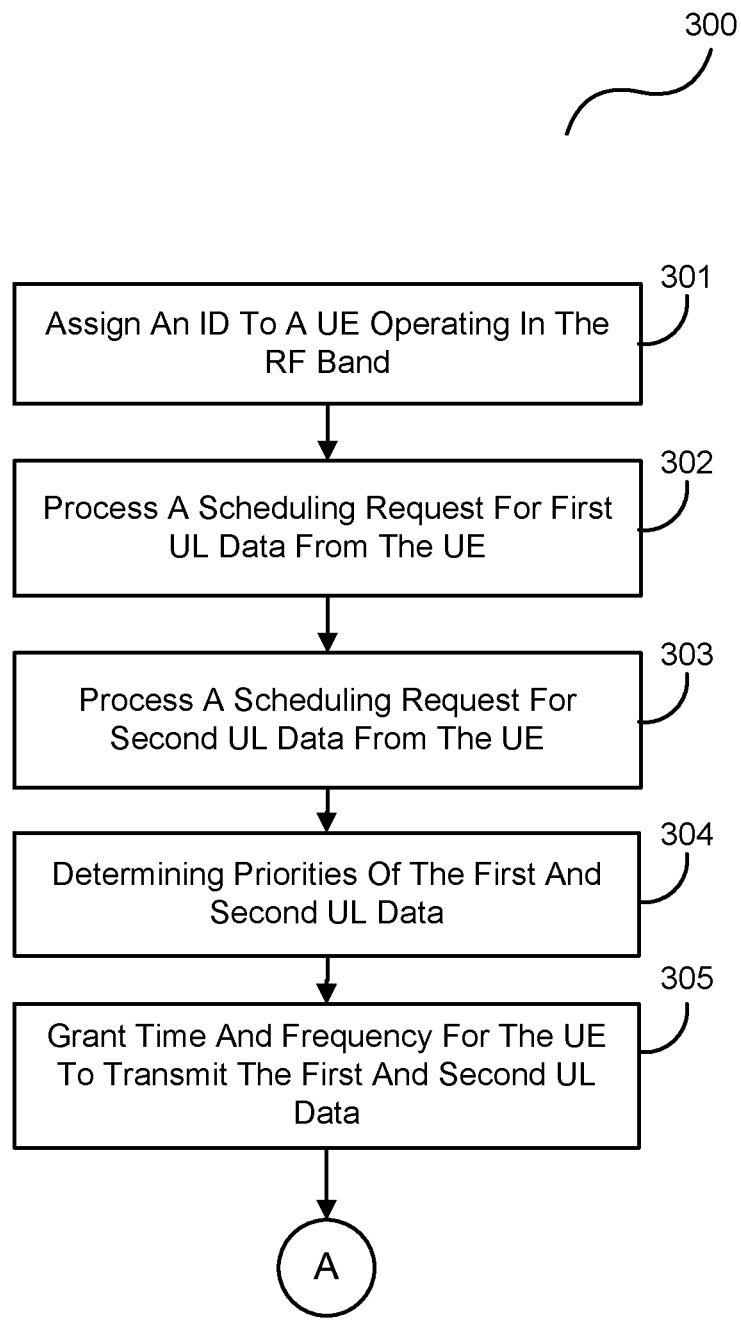
FIGS. 11A and 11B are flowcharts of an exemplary process operable with the eNodeB in the wireless telecommunications system.
Figure 11B:
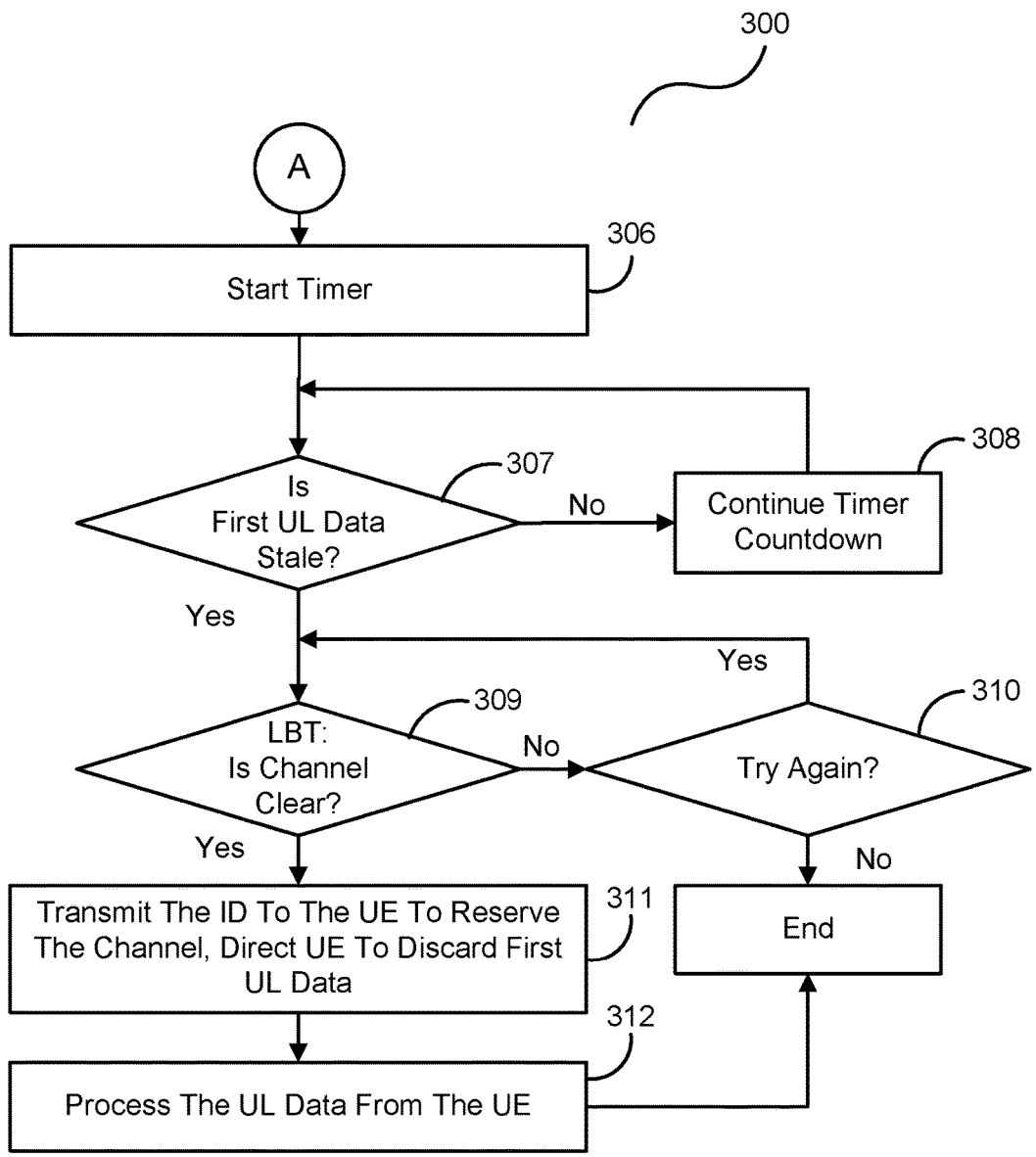
Figure 12:
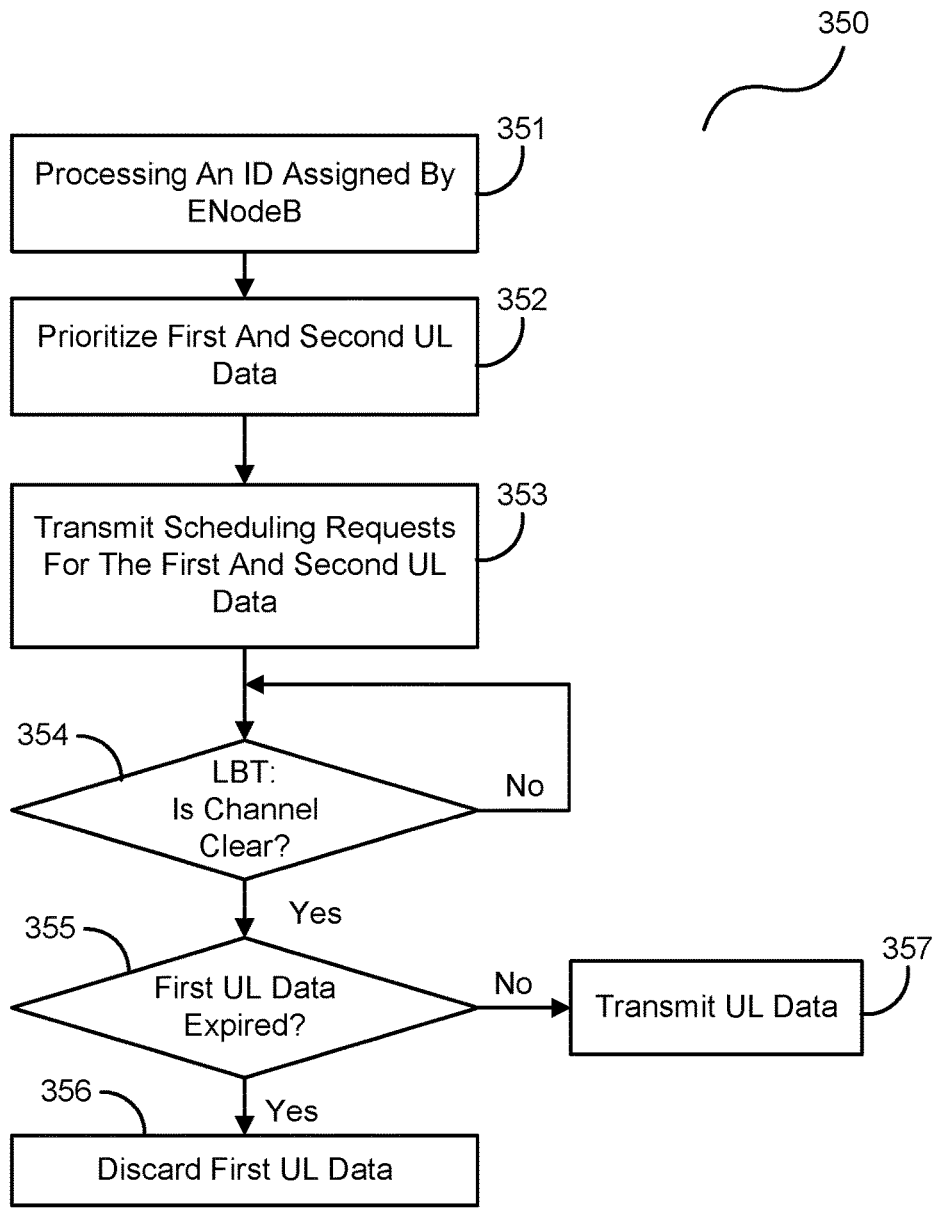
FIG. 12 is a flowchart of another exemplary process operable with the UE in the wireless telecommunications system.
Figure 13:
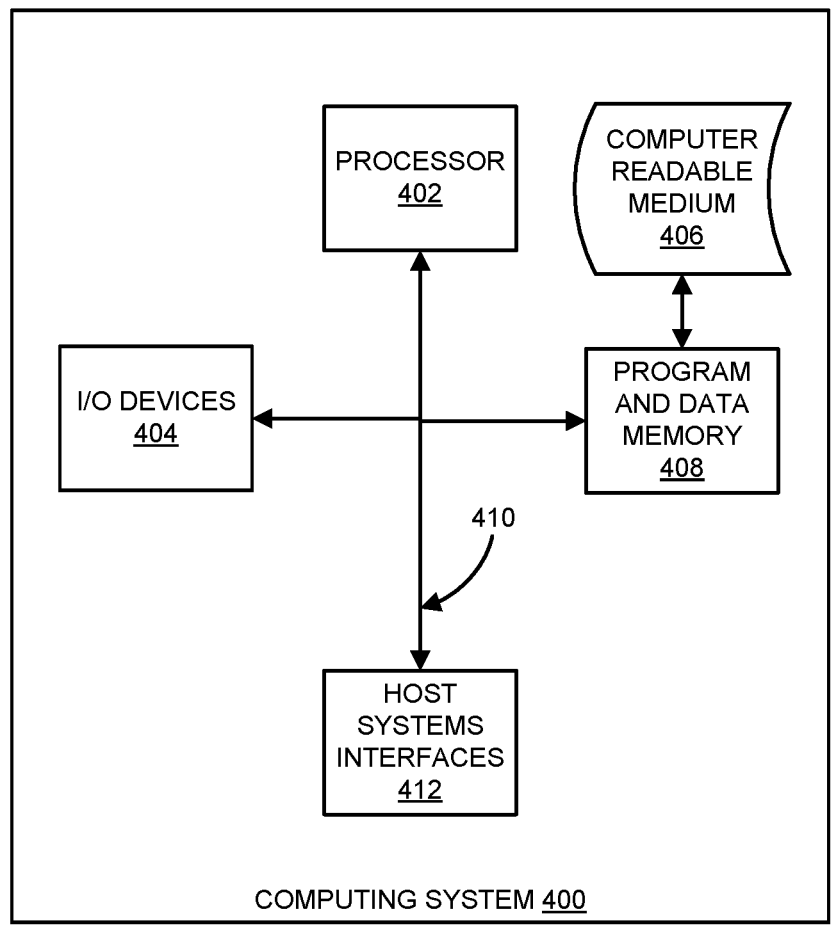
FIG. 13 is a block diagram of an exemplary computing system in which a computer readable medium provides instructions for performing methods herein.

With this in mind, FIGS. 11A, 11B, and 12 illustrate exemplary processes of the wireless telecommunications system. More specifically, FIGS. 11A and 11B are flowcharts of an exemplary process 300 operable with the eNodeB in the wireless telecommunications system, whereas FIG. 12 is a flowchart of an exemplary process 350 operable with the UE 112-1 in the wireless telecommunications system.

In FIG. 11A, the process 300 initiates when the eNodeB 111 assigns an ID (e.g., a PN sequence) to the UE 112-1, in the process element 301. The eNodeB 111 then processes SRs for the first and second UL data, in the process elements 302 and 303. The eNodeB 111 then determines priorities of the first and second UL data, in the process element 304 and grants a time and frequency for the UE 112-1 to transmit the first and second UL data, in the process element 305. The process 300 continues in FIG. 11B (via connection point "A").

In FIG. 11B, the process 300 continues (via connection point "A") with the eNodeB 111 starting a timer, in the process element 306. The eNodeB 111 may then determine whether the first UL data is stale, in the process element 307. If the first UL data is not stale, then the eNodeB 111 continues its timer countdown, in the process element 308.

If the first UL data is stale, the eNodeB 111 may perform an LBT operation to determine whether the channel is clear, in the process element 309. If the channel is clear, the eNodeB 111 transmits the ID to the UE 112-1 to reserve the granted time and frequency for the UE 112-1 (e.g., to transmit the second UL data), in the process element 311. In doing so, the eNodeB 111 may also direct the UE 112-1 to discard the first UL data. And, the eNodeB 111 then processes the second UL data from the UE 112-1, in the process element 312, and the process 300 ends. If the channel is not clear, the eNodeB 111 may try again, in the process element 310. Otherwise, the process 300 ends.

In FIG. 12, the process 350 initiates by the UE 112-1 processing the ID assigned by the eNodeB 111, in the process element 351. The UE 112-1 prioritizes the first and second UL data, in the process element 352, giving the first UL data higher priority than the second UL data. The UE 112-1 then transmits SRs for the first and second UL data, in the process element 353. Upon receiving the grants for time and frequency from the eNodeB 111, the UE 112-1 performs an LBT operation, in the process element 354, to determine whether the channel is clear.

If the channel is not clear, then the UE 112-1 determines whether the first UL data has expired, in the process element 355. For example, the eNodeB 111 establishes a timer for the higher priority data such that it can be discarded by the UE 112-1 when that data becomes stale. If the first UL data has not expired, then the UE 112-1 continues determining whether the channel is clear (i.e., the process element 354). Once the channel clears (and the first UL data has not expired), then the UE 112-1 transmits the first UL data and the lower priority second UL data to the eNodeB 111, in the process element 357. Otherwise, when the first UL data expires (i.e., process element 355), the UE 112-1 discards the first UL data, in the process element 356. The UE 112-1 may, however, still transmit the lower priority second UL data, in the process element 357.

Discarding of the first UL data may be at the direction of the eNodeB 111 or based on a timer maintained by the UE 112-1. In any case, the first UL data is discarded as it is no longer needed, as in the case with conversational voice dropping a packet of voice data that is negligible to the overall conversation.

The invention can take the form of an entirely hardware embodiment, an entirely software embodiment or an embodiment containing both hardware and software elements. In one embodiment, the invention is implemented in software, which includes but is not limited to firmware, resident software, microcode, etc. FIG. 10 illustrates a computing system 400 in which a computer readable medium 406 may provide instructions for performing any of the methods disclosed herein.

Furthermore, the invention can take the form of a computer program product accessible from the computer readable medium 406 providing program code for use by or in connection with a computer or any instruction execution system. For the purposes of this description, the computer readable medium 406 can be any apparatus that can tangibly store the program for use by or in connection with the instruction execution system, apparatus, or device, including the computer system 400.

The medium 406 can be any tangible electronic, magnetic, optical, electromagnetic, infrared, or semiconductor system (or apparatus or device). Examples of a computer readable medium 406 include a semiconductor or solid state memory, magnetic tape, a removable computer diskette, a random access memory (RAM), a read-only memory (ROM), a rigid magnetic disk and an optical disk. Some examples of optical disks include compact disk-read only memory (CD-ROM), compact disk-read/write (CD-R/W) and DVD.

The computing system 400, suitable for storing and/or executing program code, can include one or more processors 402 coupled directly or indirectly to memory 408 through a system bus 410. The memory 408 can include local memory employed during actual execution of the program code, bulk storage, and cache memories which provide temporary storage of at least some program code in order to reduce the number of times code is retrieved from bulk storage during execution. Input/output or I/O devices 404 (including but not limited to keyboards, displays, pointing devices, etc.) can be coupled to the system either directly or through intervening I/O controllers. Network adapters may also be coupled to the system to enable the computing system 400 to become coupled to other data processing systems, such as through host systems interfaces 412, or remote printers or storage devices through intervening private or public networks. Modems, cable modem and Ethernet cards are just a few of the currently available types of network adapters.

What is claimed is:

1. A method operable with an eNodeB operating in a radio frequency (RF) band comprising a conflicting wireless technology, the method comprising:
   assigning an ID to a user equipment (UE) operating in the RF band;
   processing a scheduling request for first uplink (UL) data from the UE;
   processing another scheduling request for second UL data from the UE;
   determining priorities of the first and second UL data based on priority indicators in the scheduling requests;
   granting time and frequency for the UE to transmit the first and second UL data;
   waiting until the UE performs a Listen Before Talk (LBT) operation, wherein the LBT operation determines whether the granted time and frequency are occupied by another wireless system comprising a different wireless technology;
   determining that the first UL data is stale;
   transmitting the ID to the UE to reserve the granted time and frequency for the second UL data when unoccupied by the other wireless system; and
   processing the second UL data from the UE.

2. The method of claim 1, further comprising:
   directing the UE to discard the first UL data.

3. The method of claim 1, wherein:
   the other wireless system is a WiFi system.

4. The method of claim 1, wherein:
   determining priorities of the first and second UL data is based on a quality of service (QoS) of the first and second UL data;
   the first UL data has a higher priority than the second UL data; and
   the method further comprises establishing a timer for the first UL data.

5. The method of claim 1, wherein:
   the eNodeB communicates to the UE via Long Term Evolution (LTE) communications.

6. The method of claim 1, wherein:
   the ID is a pseudo random number sequence.

7. A method operable with a user equipment (UE) operating in a radio frequency (RF) band comprising a conflicting wireless technology, the method comprising:
processing an ID of the user equipment (UE) operating in the RF band;
prioritizing first uplink (UL) data and second UL data, wherein the first UL data has a higher priority than the second UL data;
transmitting scheduling requests for the first and second UL data from the UE to the eNodeB indicating priorities of the first and second UL data;
waiting until the granted time and frequency are clear of another wireless system employing a different wireless technology operating in the RF band;
discarding the first UL data; and
transmitting the second UL data from the UE to the eNodeB.

8. The method of claim 7, further comprising:
discarding the UL data at the direction of the eNodeB based on a timer established by the eNodeB.

9. The method of claim 7, wherein:
the other wireless system is a WiFi system.

10. The method of claim 7, further comprising:
receiving the ID from the eNodeB to reserve the time and frequency for the second UL data granted by the eNodeB.

11. The method of claim 7, wherein:
the UE transmits the second UL data to the eNodeB via Long Term Evolution (LTE) communications.

12. The method of claim 7, wherein:
the ID is a pseudo random number sequence.

13. An eNodeB operating in a radio frequency (RF) band comprising a conflicting wireless technology, the eNodeB comprising:
a processor operable to assign an ID to a user equipment (UE) operating in the RF band, to process a scheduling request for first uplink (UL) data from the UE, to process another scheduling request for second UL data from the UE, to determine priorities of the first and second UL data based on priority indicators in the scheduling requests, to grant time and frequency for the UE to transmit the first and second UL data, to wait until the UE performs a Listen Before Talk (LBT) operation, and to determine that the first UL data is stale, wherein the LBT operation determines whether the granted time and frequency are occupied by another wireless system comprising a different wireless technology; and
an interface operable to transmit the ID to the UE to reserve the granted time and frequency for the second UL data when unoccupied by the other wireless system, and to receive the second UL data from the UE for processing by the processor.

14. The eNodeB of claim 13, wherein:
the processor is further operable to direct the UE to discard the first UL data.

15. The eNodeB of claim 13, wherein:
the other wireless system is a WiFi system.

16. The eNodeB of claim 13, wherein:
the processor is further operable to determine priorities of the first and second UL data based on a quality of service (QoS) of the first and second UL data;
the first UL data has a higher priority than the second UL data;
the processor is further operable to establish a timer for the first UL data.

17. The eNodeB of claim 13, wherein:
the eNodeB communicates to the UE via Long Term Evolution (LTE) communications.

18. The eNodeB of claim 13, wherein:
the ID is a pseudo random number sequence.

* * * * *